United States Patent
Simony

(10) Patent No.: US 7,189,955 B2
(45) Date of Patent: Mar. 13, 2007

(54) DEVICE AND METHOD FOR CORRECTING THE RESET NOISE AND/OR THE FIXED PATTERN NOISE OF AN ACTIVE PIXEL FOR AN IMAGE SENSOR

(75) Inventor: Laurent Simony, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 49 days.

(21) Appl. No.: 11/127,766

(22) Filed: May 11, 2005

(65) Prior Publication Data

US 2005/0264660 A1    Dec. 1, 2005

(30) Foreign Application Priority Data

May 12, 2004    (FR) .................................. 04 50915

(51) Int. Cl.
  *H01L 27/00* (2006.01)
  *H04N 5/217* (2006.01)
(52) U.S. Cl. .................................... 250/208.1; 348/241
(58) Field of Classification Search ............ 250/208.1, 250/214 R, 214 A, 214 C; 348/241; 327/514
See application file for complete search history.

(56) References Cited

U.S. PATENT DOCUMENTS 6,532,040 B1    3/2003    Kozlowski et al. ......... 348/241
6,587,142 B1 *  7/2003    Kozlowski et al. ......... 348/241

OTHER PUBLICATIONS

Pain, B., et al., "Analysis and Enhancement of Low-light-level Performance of Photodiode-Type CMOS Active Pixel Imagers Operated with Sub-threshold Reset," in *Proceedings of the IEEE Workshop on CCDs and AIS*, Nagano, Japan, Jun. 1999, pp. 140-142.
Fowler, G., et al., "Low Noise Readout using Active Reset for CMOS APS," in *Proceedings of SPIE*, vol. 3965, pp. 126-135, 2000.

* cited by examiner

*Primary Examiner*—Thanh X. Luu
(74) *Attorney, Agent, or Firm*—Lisa K. Jorgenson; Timothy L. Boller; Seed IP Law Group PLLC

(57) ABSTRACT

A device for correcting the reset noise and/or the fixed pattern noise of an active pixel comprising a photosensitive element, the device comprising a transmission circuit connecting the photosensitive element to a correction node and operating with a first or a second transmission gain; a circuit for providing a correction voltage equal to the sum of a constant voltage and of the noise multiplied by an amplification gain equal to the inverse of the difference between the first and second transmission gains; and a correction circuit capable of bringing the correction node from the constant voltage to the correction voltage, the transmission circuit having the first transmission gain, and of bringing the correction node to the constant voltage, the transmission circuit having the second transmission gain.

10 Claims, 4 Drawing Sheets

DEVICE AND METHOD FOR CORRECTING THE RESET NOISE AND/OR THE FIXED PATTERN NOISE OF AN ACTIVE PIXEL FOR AN IMAGE SENSOR

BACKGROUND OF THE INVENTION

1. Field of the Invention

The present disclosure relates to a device and a method for correcting the reset noise and/or the fixed pattern noise of an active pixel for an image sensor.

2. Description of the Related Art

A conventional active pixel essentially comprises a photosensitive element, such as a photodiode, connected to a node, called the photosensitive node having a voltage varying according to the charge accumulated by the photosensitive element. The pixel further comprises three transistors, a select transistor for selecting the pixel, a reset transistor for resetting the electric charge of the photosensitive element, and a read transistor for providing a signal representative of the voltage at the photosensitive node.

The operation of such a pixel mainly comprises the following steps:

a reset step during which the reset transistor is on. The voltage at the photosensitive node is then brought to a determined constant voltage;

a charge step during which the reset transistor and the select transistor are blocked. The photosensitive element accumulates charges, which tends to vary the voltage at the photosensitive node; and a read step during which the reset transistor is off and the select transistor is on. The voltage at the photosensitive node is measured by a read circuit, not shown.

A limitation of active pixel image sensors is the presence of a fixed pattern noise, which adds to the constant voltage determined at the photosensitive noise in the reset step. The fixed pattern noise corresponds to a random offset, due, for example, to the pixel read transistor, which is constant for a given pixel but which varies for each pixel of the sensor.

A known method for suppressing the fixed pattern noise of a pixel consists of measuring a first signal representative of the voltage at the photosensitive node at the end of a read step and of measuring a second signal representative of the voltage at the photosensitive node at the end of the next reset step. The fixed pattern noise is then suppressed by calculating the difference between the two measured signals.

Another limitation of active pixel image sensors is the presence of a random reset noise in the electric signals generated by the sensor pixels. Indeed, at the end of each pixel reset step, when the reset transistor switches from the on state to the off state, the voltage at the read node is set to a determined constant voltage to which a reset noise of different amplitude adds at each reset. The reset noise is then found on the photosensitive node in the next read step. The reset noise is particularly disturbing since it is preponderating with respect to the other noises in the analog signal acquisition chain.

Various methods exist to limit or correct the reset noise.

A first method is discussed in the document entitled "Analysis and enhancement of low-light-level performance of photodiode-type CMOS active pixel imagers operated with sub-threshold reset" by Pain, Yang, Ortiz, Wrigley, Hancock, and Cunningham, IEEE Workshop on CCDs and AIS, Nagano (Japan), pp. 140–142, June 1999. The technique discussed in this document, known as the "hard then soft reset", consists of using a reset transistor operating under its conduction threshold. However, this technique only enables reducing the reset noise by a factor $\sqrt{2}$.

A second method is discussed in the document entitled "Low Noise Readout using Active Reset for CMOS APS" by Fowler, Godfrey, Balicki, and Canfield, Proceedings of SPIE, vol. 3965, pp. 126–135, 2000. The technique discussed in this document consists of resetting the photodiode by using an amplifier to negatively feedback the reset noise. This technique exhibits certain disadvantages, especially a high number of transistors per pixel (6 transistors), the need for a high supply voltage since there are several cascade-assembled transistors, the need for a non-noisy voltage ramp, and an implementation which is not easily compatible with a pixel array.

A third known method consists of successively memorizing signals representative of the voltage at the photosensitive node after the reset step and at the next read step. The difference between the two memorized signals enables suppressing the reset noise added at the end of the reset step. However, the implementation of such a method has a high cost since it requires, for each sensor pixel, the keeping in memory of the signal representative of the voltage at the photosensitive node at the end of the reset step during the entire next charge step.

BRIEF SUMMARY OF THE INVENTION

The present disclosure aims at providing a device for correcting the reset noise and/or the fixed pattern noise of an active pixel for an image sensor enabling practically completely suppressing the reset noise and/or the fixed pattern noise, having a particularly simple structure and having a reduced manufacturing cost.

The present disclosure also aims at providing a method for correcting the reset noise and the fixed pattern noise of an active pixel for an image sensor enabling practically full suppression of the reset noise and of the fixed pattern noise and having a particularly simple implementation.

To achieve these objects, embodiments of the present invention provide a device for correcting the reset noise and/or the fixed pattern noise of an active pixel comprising a photosensitive element connected to a read node, the voltage of the read node being representative of the charge of the photosensitive element, the charge of the photosensitive element being reset in a reset step. In one embodiment, the device comprises a transmit circuit connecting the photosensitive element to a correction node and being capable of operating in a first operating state in which the transmission gain between the correction node and the read node is equal to a first transmission gain and in a second operating state in which the transmission gain between the correction node and the read node is equal to a second transmission gain; a circuit for measuring the voltage at the read node after reset of the charge of the photosensitive element, said voltage comprising a reset noise component and/or a fixed pattern noise component; a circuit for providing a correction voltage equal to the sum of a constant voltage and of a correction voltage, comprising the reset noise component and/or the fixed pattern noise component multiplied by an amplification gain having an absolute value equal to the absolute value of the inverse of the difference between the first transmission gain and the second transmission gain; and a correction circuit capable of bringing the correction node from the constant voltage to the correction voltage, the transmit circuit being in the first operating state, and of bringing the correction node to the constant voltage, the transmit circuit being in the second operating state to subtract the reset noise component and/or the fixed pattern noise component from the voltage at the read node.

According to an embodiment of the present invention, the pixel is contained in an array of identical pixels arranged in rows and in columns, the measurement circuit, the provision circuit, and the correction circuit being common for the pixels of the column of said pixel, the measurement circuit being connected to a read track connected to each read node of the pixels of the column of said pixel and the correction circuit being connected to a return track connected to each node of correction of the pixels of the column of said pixel.

According to an embodiment of the present invention, the transmit circuit comprises a transistor and a capacitor series-assembled between the correction node and the photosensitive element, the transistor being on in the first operating state of the transmit circuit and being off in the second transmission state of the transmit circuit.

According to an embodiment of the present invention, the circuit for providing the correction voltage comprises an operational amplifier having an input connected to the measurement circuit via a connection capacitor.

According to an embodiment of the present invention, the amplifier further comprises an input connected to the output of the amplifier via a first capacitor and connected to a reference voltage by a second capacitor.

According to an embodiment of the present invention, the absolute value of the first transmission gain is greater than the absolute value of the second transmission gain.

According to an embodiment of the present invention, the correction circuit is capable of bringing the voltage at the read node to a predetermined constant value equal to the average value of the voltages at the read nodes of the pixels of the pixel array after a pixel reset step.

Embodiments of the present invention also provide a method for correcting the reset noise and/or the fixed pattern noise of an active pixel comprising a photosensitive element connected to a read node, the voltage of the read node being representative of the charge of the photosensitive element, the charge of the photosensitive element being reset in a reset step, the photosensitive element being connected to a correction node via a transmit circuit capable of operating in a first operating state in which the transmission gain between the correction node and the read node is equal to a first transmission gain and in a second operating state in which the transmission gain between the correction node and the read node is equal to a second transmission gain. The method comprises the steps of measuring the voltage at the read node after reset of the charge of the photosensitive element, said voltage comprising a reset noise component and/or a fixed pattern noise component; providing a correction voltage equal to the sum of a constant voltage and of a correction voltage, comprising the reset noise component and/or the fixed pattern noise component multiplied by an amplification gain having an absolute value equal to the absolute value of the inverse of the difference between the first transmission gain and the second transmission gain; bringing the correction node from the constant voltage to the correction voltage, the transmit circuit being in the first operating state; switching the transmit circuit from the first operating state to the second operating state; and bringing the correction node to the constant voltage to subtract the reset noise component and/or the fixed pattern noise component from the voltage at the read node.

According to an embodiment of the present invention, said active pixel having its voltage at the read node measured after reset of the charge of the photosensitive element of said active pixel is in a column of identical active pixels, the read nodes of all the pixels in the column being connected to one another and the correction nodes of all the pixels in the column being connected to one another. The transmit circuit of each active pixel in the column, other than the pixel having the voltage at its read node measured, is maintained in the second operating state when the correction node of the active pixel, having the voltage at its read node measured, is brought from the constant voltage to the correction voltage and brought back to the constant voltage.

According to an embodiment of the present invention, there is no reading of the voltage at the read node after the reset step.

In one embodiment, an array of active pixels, comprising: a first read track; a first correction track; a first set of active pixels, each pixel in the first set of active pixels being coupled to the first read track and to the first correction track and comprising: a photosensitive module; and a transmission module; and a first noise control module coupled to the first read track and to the first correction track and comprising: a measurement module configured to measure a voltage on the first read track, the measured voltage on the first read track having a first noise component; and an amplification module coupled to the measurement module and to the first correction track and configured to generate a correction voltage to compensate for the first noise component.

In one embodiment, the first set of active pixels are arranged in a column and the array further comprises: a second read track; a second correction track; a second set of active pixels arranged in a column, each pixel in the second set of active pixels being coupled to the second read track and to the second correction track and comprising: a photosensitive module; and a transmission module; and a second noise control module coupled to the second read track and to the second correction track and comprising: a measurement module configured to measure a voltage on the second read track, the measured voltage on the second read track having a second noise component; and an amplification module coupled to the measurement module and to the second correction track and configured to generate a correction voltage to compensate for the second noise component.

In one embodiment, the first noise component includes a reset noise component. In one embodiment, the first noise component includes a fixed pattern noise component. In one embodiment, the first noise component includes a reset noise component and a fixed pattern noise component.

In one embodiment, the transmission module of each pixel in the first set of active pixels is configured to operate in a first mode having a first transmission gain and in a second mode having a second transmission gain and the amplification module has an amplification gain equal to an absolute value of an inverse of a difference between the first transmission gain and the second transmission gain.

In one embodiment, the photosensitive module of each pixel in the first set of pixels comprises: a photosensitive element; a select transistor; a reset transistor; and a read transistor.

In one embodiment, the transmission module of each pixel in the first set of pixels comprises: a capacitor coupled to the first correction track; and a correction transistor coupled between the capacitor and the photosensitive element.

In one embodiment, the amplification module comprises: an operational amplifier; a first capacitor coupled at a first end to a first input of the operational amplifier; a first switch configured to selectively couple the first input of the operational amplifier to a first reference voltage in response to a first control signal; a second switch configured to selectively couple a second end of the first capacitor to a second reference voltage in response to a second control signal; a second capacitor coupled at a first end to a second input of the operational amplifier and at a second end to an output of the operational amplifier; a third capacitor coupled at a first end to the second input of the operational amplifier and at a second end to a third reference voltage; and a third switch configured to selectively coupled the second input of the operational amplifier to the output of the operational amplifier in response to the first control signal; and the measurement module comprises a fourth switch configured to selectively couple the second end of the first capacitor to the first read track in response to the first control signal.

In one embodiment, the first noise control module further comprises a fifth switch configured to selectively couple the output of the operational amplifier to the first correction track in response to the second control signal; and a sixth switch configured to selectively couple the first correction track to the first reference voltage in response to the first control signal.

In one embodiment, the amplification module comprises: an operational amplifier; a first capacitor coupled at a first end to a first input of the operational amplifier; a second capacitor coupled at a first end to a first reference voltage; a first switch configured to selectively couple the first input of the operational amplifier to a second reference voltage in response to a first control signal; a second switch configured in a first mode to couple a second end of the first capacitor to a third reference voltage and configured in a second mode to couple the second end of the first capacitor to a second end of the second capacitor, wherein the second switch is configured to toggle between the first and second mode in response to a second control signal; a third capacitor coupled at a first end to a second input of the operational amplifier and at a second end to an output of the operational amplifier; a fourth capacitor coupled at a first end to the second input of the operational amplifier and at a second end to the first reference voltage; and a third switch configured to selectively coupled the second input of the operational amplifier to the output of the operational amplifier in response to the first control signal; and the measurement module comprises a fourth switch configured to selectively couple the second end of the second capacitor to the first read track in response to the first control signal.

In one embodiment, the first noise control module further comprises a fifth switch configured in a first mode to couple the first correction track to the output of the operational amplifier and configured in a second mode to couple the first correction track to the second reference voltage, wherein the fifth switch is configured to toggle between the first and second mode in response to a third control signal.

In one embodiment, an array of active pixels comprises: a column of pixels, each pixel in the column comprising: a photosensitive element; and means for transmitting a correction signal to the photosensitive element; means for compensating for noise comprising: means for detecting a noise component; means for generating a correction signal; and means for supplying the correction signal to the column of pixels.

In one embodiment, the means generating a correction signal comprises: an operational amplifier; a first capacitor coupled at a first end to a first input of the operational amplifier; a second capacitor coupled at a first end to a first reference voltage; a first switch configured to selectively couple the first input of the operational amplifier to a second reference voltage in response to a first control signal; a second switch configured in a first mode to couple a second end of the first capacitor to a third reference voltage and configured in a second mode to couple the second end of the first capacitor to a second end of the second capacitor, wherein the second switch is configured to toggle between the first and second mode in response to a second control signal; a third capacitor coupled at a first end to a second input of the operational amplifier and at a second end to an output of the operational amplifier; a fourth capacitor coupled at a first end to the second input of the operational amplifier and at a second end to the first reference voltage; and a third switch configured to selectively coupled the second input of the operational amplifier to the output of the operational amplifier in response to the first control signal.

In one embodiment, a method for correcting noise in a column of pixels of an active pixel array comprises the steps of: resetting a photosensitive element in a first pixel in the column of pixels; measuring a voltage at a read node of the first pixel, said voltage comprising at least one noise component; generating a correction voltage based at least in part on the noise component of the measured voltage; coupling the correction voltage to a transmission module of the first pixel, the transmission module operating in a first state; switching the transmission module from the first state to a second state of operation; and coupling the transmission module to the reference voltage.

In one embodiment, the transmission module has a first transmission gain during the first mode of operation and a second transmission gain during the second mode of operation and generating a correction voltage comprises amplifying a signal based at least in part on the noise component by an amplification gain equal to an absolute value of an inverse of a difference between the first transmission gain and the second transmission gain.

The foregoing and other objects, features, and advantages of embodiments of the present invention will be discussed in detail in the following non-limiting description of specific embodiments in connection with the accompanying drawings.

DETAILED DESCRIPTION OF THE INVENTION

Figure 1:
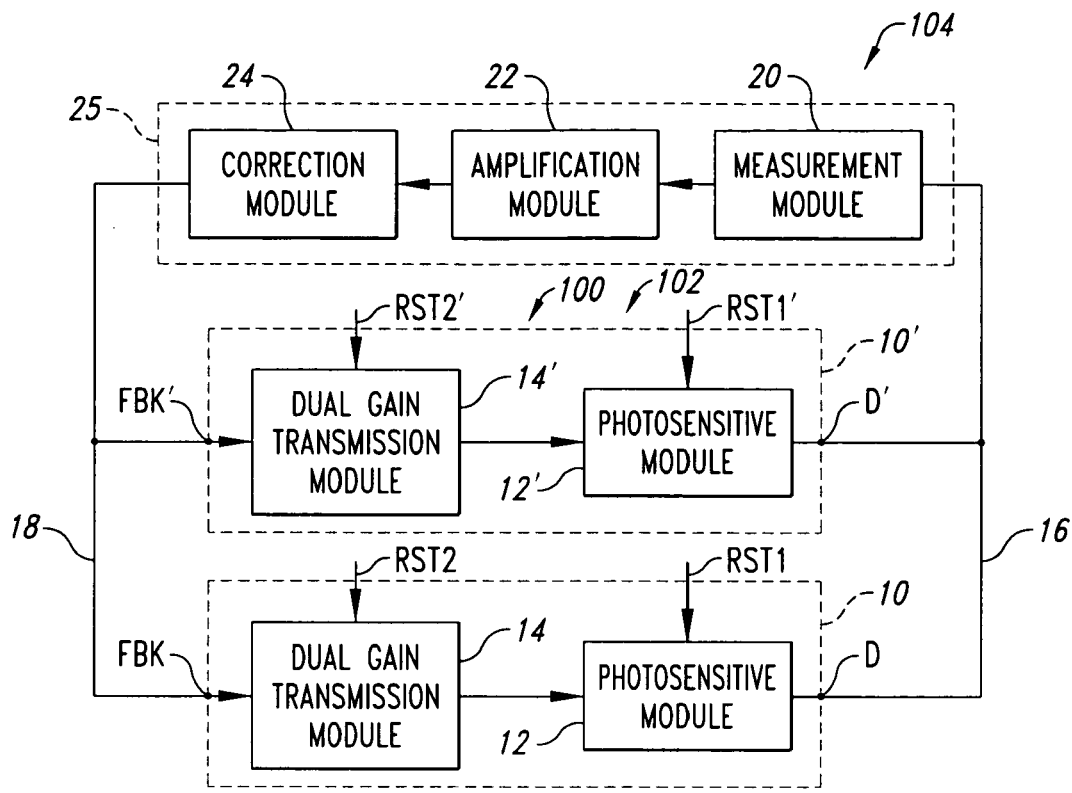
FIG. 1 schematically shows an example of an embodiment of a correction device according to the present invention.

FIG. 1 schematically shows two pixels 10, 10' of a same pixel column 100 of a pixel array 102 of an image sensor 104. Each pixel 10, 10' comprises a photosensitive module or circuit 12, 12' conventionally comprising a photosensitive element, a select transistor, a reset transistor, and a read transistor. The reset transistor is controlled by a binary reset signal RST1, RST1'. Each pixel 10, 10' comprises a dual-gain transmission module or circuit 14, 14' connected to photosensitive module 12, 12'. Photosensitive module 12, 12' is connected to a read node D, D' of a read track 16 to which are connected all the pixels in the pixel column. Pixel 10, 10' is capable, when the select transistor associated with the pixel is on, of bringing node D, D' to a voltage representative of the charge stored by the photosensitive element of pixel 10, 10'. Transmissior module 14, 14' is connected to a correction point FBK, FBK' of a return track 18 to which are connected all the pixels in the pixel column.

For each pixel 10, 10', transmission module 14, 14' is controlled by a binary control signal RST2, RST2' so that when control signal RST2, RST2' is in a first state, for example, the high state, the voltage transmission gain between points FBK and D (respectively, FBK' and D') is at a first value Gon and when control signal RST2, RST2' is in a second state, for example, the low state, the voltage transmission gain between nodes FBK and D (respectively, FBK' and D') is at a second value Goff.

A noise control module or circuit 25 comprises a measurement module or circuit 20, an amplification module or circuit 22 and a correction module or circuit 24. For each pixel column in the illustrated embodiment, read track 16 is connected to the measurement module 20 capable of measuring, for example, continuously or at a given time, the voltage at read node D, D' of a selected pixel 10, 10' of the pixel column 100. Measurement module 20 is connected to the amplification module 22 which provides a correction voltage ΔV from the voltage measured by measurement module 20. Amplification module 22 is connected to the correction module 24 which is capable of varying, for each pixel 10, 10' of the pixel column 100, the voltage of node FBK, FBK' between a quiescent reference voltage VCM and the quiescent voltage to which correction voltage ΔV has been added.

The correction method according to an embodiment of the present invention consists, for each pixel 10, 10' of the pixel column 100, of varying the voltage at node FBK, FBK' successively by +ΔV and by −ΔV. For pixel 10 for which the voltage at node D is desired to be corrected, the transmission gain between nodes FBK and D is set to Gon when the voltage variation at node FBK is +ΔV, and the transmission gain between nodes FBK and D is set to Goff when the voltage variation at node FBK is −ΔV. The voltage at read node D then varies by ΔV*(Gon−Goff). As will be explained in further detail hereafter, by setting in adapted fashion correction voltage ΔV, the voltage at node D can be corrected to suppress the reset noise and the fixed pattern noise. For every other unselected pixel 10' in the pixel column, the transmission gain between nodes FBK' and D' is maintained at Goff throughout the voltage variations at node FBK'. The resulting variation of the voltage at read node D' of an associated unselected pixel 10' then is generally zero.

In more detailed fashion, the correction method according to an embodiment of the present invention comprises the steps of:

selecting a pixel 10 in the pixel column 100, the other pixels 10' in the column 100 being unselected;

conventionally resetting voltage $V_D$ at node D of the selected pixel 10 by turning on the reset transistor of pixel 10. When the reset transistor switches to the off state at the end of the reset step, the voltage at node D is set to a value $V_{DINI}$ which is provided by the following equation:

$$V_{DINI}=V_0+V_{ktc}+V_{off} \quad (1)$$

where $V_0$ is an average component, $V_{ktc}$ is a reset noise component, and $V_{off}$ is a fixed pattern noise;

measuring voltage $V_{DINI}$ via measurement module or circuit 20;

having amplification module or circuit 22 provide a correction voltage, equal to the sum of quiescent voltage VCM and of a correction voltage ΔV given by the following relation:

$$\Delta V = Ga*(V_{DINI}-V_{REF}) \quad (2)$$

where Ga is an amplification gain and $V_{REF}$ a reference voltage; and having correction module or circuit 24 vary the voltage at nodes FBK, FBK' of each pixel 10, 10' of the pixel column 100 successively by +ΔV, the transmission gain of transmission module 14 of selected pixel 10 being equal to Gon, then by −ΔV, the transmission gain of transmission module 14 of selected pixel 10 being equal to Goff.

In the next step of the correction method according to an embodiment of the present invention, the transmission gain of transmission unit 14' of the unselected pixels 10' in the column remains constant and equal to Goff.

Figures 2A, 2B:
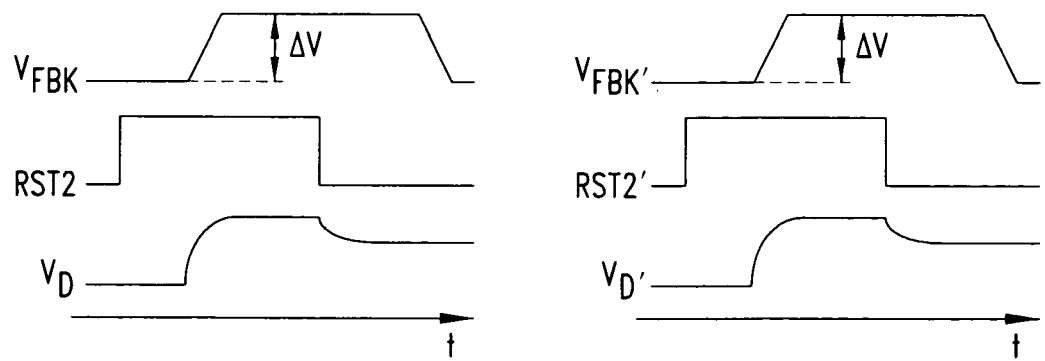
FIGS. 2A and 2B respectively show an example of a timing diagram of signals representative of the operation of the device of FIG. 1 for a selected pixel and a non-selected pixel of an image sensor.

FIGS. 2A and 2B illustrate the last step of the previously-described method respectively for a selected pixel 10 and an unselected pixel 10' of a same column 100 of the image sensor 104.

For the selected pixel (FIG. 2A), the voltage at node D reaches a new value $V_{DFINAL}$ given by the following relation:

$$V_{DFINAL}=V_{DINI}+\Delta V*(Gon-Goff) \quad (3)$$

Given the expression of ΔV, equation (3) becomes:

$$V_{DFINAL}=V_{DINI}-V_{REF}+(V_{DINI}-V_{REF})*Ga*(Gon-Goff)+V_{REF}V_{DFINAL}=(V_{DINI}-V_{REF})*(1+Ga*(Gon-Goff))+V_{REF} \quad (4)$$

By setting amplification gain Ga to obtain:

$$Ga=-1/(Gon-Goff) \quad (5)$$

one obtains:

$$VDFINAL=VREF \quad (6)$$

The reset noise component and the fixed pattern noise component are then suppressed. It may be desirable to take $V_{REF}$ close to $V_0$ so that the difference between $V_{DINI}$ and $V_{REF}$ substantially corresponds to the sum of the noise component of the reset noise and of the fixed pattern noise. In practice, reference voltage $V_{REF}$ may be equal to average value $V_0$ of the voltages at read nodes D of the pixels of the pixel array after a pixel reset step.

For an unselected pixel 10' (FIG. 2B) in the pixel column, the voltage variation at node D' is generally zero throughout the successive switchings of the voltage at node FBK' from VCM to VCM+ΔV and from VCM+ΔV to VCM since the transmission gain of the transmit unit 14' associated with pixel 10' remains equal to Goff.

Embodiments of the present invention have many advantages:

First, they enable, for each pixel of an image sensor, correcting the voltage at the pixel read node after reset by suppressing the reset noise component and the fixed pattern noise component.

Second, they enable, if desirable, avoiding the two successive measurements of the voltage at node D, before and after reset, usually performed to suppress the fixed pattern noise component.

Third, the correction method according to embodiments of the present invention has no influence upon the pixels of the pixel column other than the pixel for which the voltage at node D is desired to be corrected.

Figure 3:
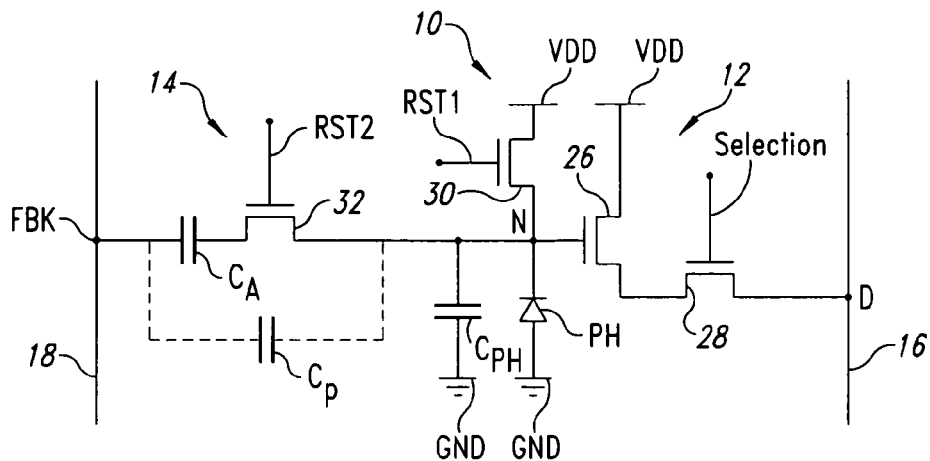
FIG. 3 schematically shows a more detailed example of the forming of a pixel according to the present invention of the device of FIG. 1.

FIG. 3 shows a more detailed example of the forming of the transmission module 14 of a pixel 10 according to the present invention. The present example is described for a pixel 10 having a photosensitive unit 12, conventionally, of follower type. Clearly, the embodiments of the present invention may be applied to different types of photosensitive units, such as a photosensitive unit having the structure of a CTIA-type amplifier pixel (capacitive trans-impedance amplifier).

Pixel 10 comprises a photodiode PH having its anode connected to a low reference voltage, for example, ground GND, and having its cathode connected to a node N called a photosensitive node. Photodiode PH has an internal capacitance represented by a capacitor $C_{PH}$ of capacitance $C_{ph}$ arranged across photodiode PH. Node N is connected to the gate of a read MOS transistor 26 having its drain connected to a high reference voltage VDD and having its source connected to read node D of read track 16 via a MOS select transistor 28. The gate of MOS select transistor 28 is controlled by a select signal Select. Node N is also connected to voltage VDD via a MOS reset transistor 30 having its gate controlled by reset signal RST1.

The reset of pixel 10 is obtained by turning on reset transistor 30, which brings the voltage of node N to a fixed value. At the end of the reset step, when reset transistor 30 switches from the on state to the off state, the voltage at node D is set to a determined constant value to which adds the reset noise and the fixed pattern noise.

Pixel 10 is connected to return track 18 via a series-coupled MOS correction transistor 32 and capacitor $C_A$, of capacitance $C_a$. More specifically, the drain of correction transistor 32 is connected to node N of pixel 10 and the source of correction transistor 32 is connected to a terminal of capacitor $C_A$ having its other terminal connected to a node FBK of return track 18. The gate of correction transistor 32 is controlled by control signal RST2.

The present example embodiment takes into account the fact that return transistor 32 comprises an internal capacitance of non-negligible coupling. An equivalent capacitor $C_p$ of capacitance $C_p$ connecting nodes FBK and N has been shown in dotted lines of FIG. 3. The voltage transmission gain between nodes FBK and D thus varies according to whether correction transistor 32 is on or off. Indeed, when transistor 32 is on, transmission gain Gon between nodes FBK and D is substantially equal to:

$$Gon=(C_a+C_p)/(C_a+C_p+C_{ph}) \qquad (7)$$

When transistor 32 is off, transmission gain Goff between nodes FBK and D is substantially equal to:

$$Goff=C_p/(C_p+C_{ph}) \qquad (8)$$

Figure 4:
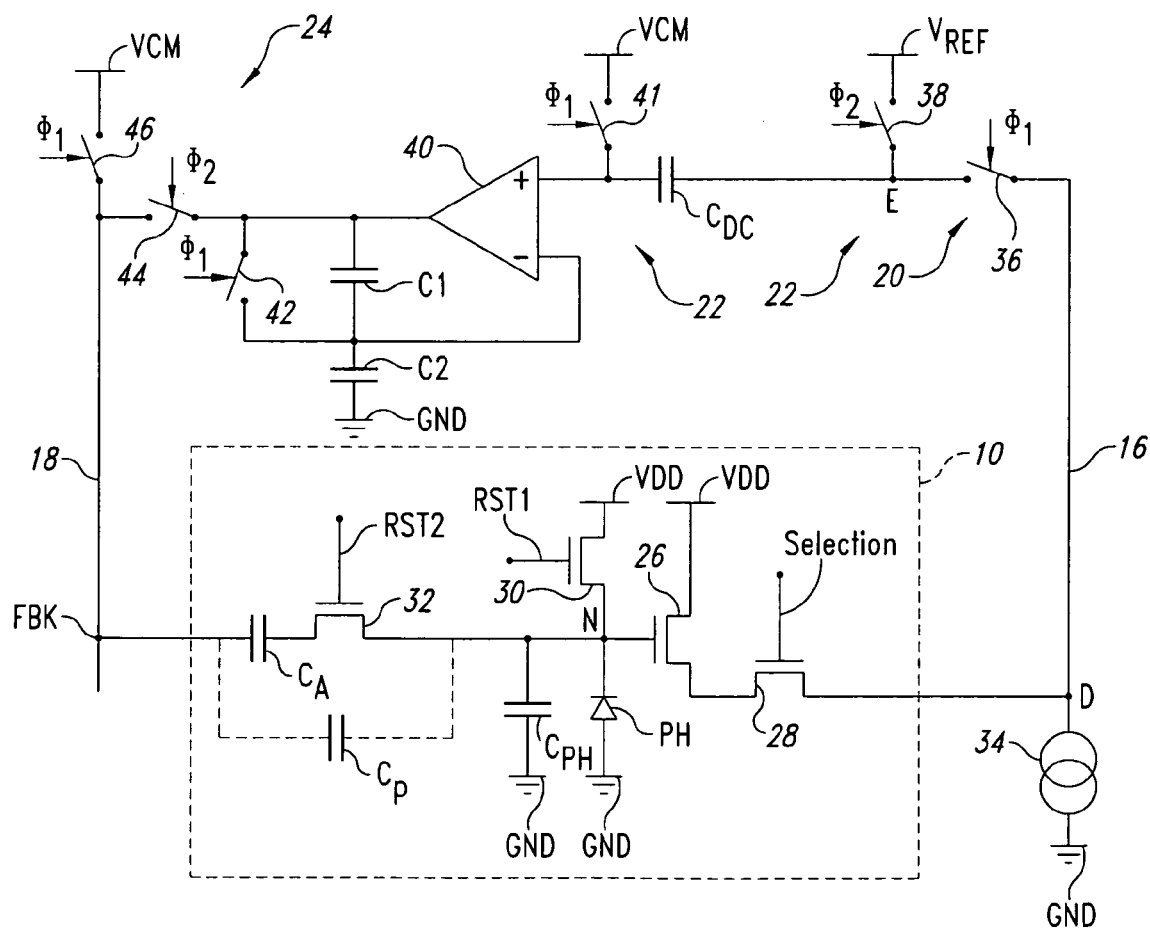
FIG. 4 schematically shows a first more detailed example of the forming of the correction device of FIG. 1.

FIG. 4 shows a first detailed example of the forming of the correction device according to an embodiment of the present invention for a pixel 10 such as that shown in FIG. 3. A single pixel 10 of the pixel array of the image sensor 104 is shown in FIG. 4.

Read track 16 is connected to a terminal of a current source 34 having its other terminal connected to ground GND. For each column in the array, the correction device according to the illustrated embodiment of the present invention comprises a controlled switch 36 having a terminal connected to read track 16 and having its other terminal connected to a node E. Switch 36 is controlled by a binary control signal $\Phi_1$. Correction device comprises a switch 38, controlled by a binary signal $\Phi_2$, arranged between node E and a source of a constant reference voltage $V_{REF}$. Node E is connected to a terminal of a capacitor $C_{DC}$ having its other terminal connected to the non-inverting input (+) of an operational amplifier 40. The correction circuit comprises a switch 41, controlled by signal $\Phi_1$, connecting the non-inverting input (+) of amplifier 40 to a source of a constant voltage VCM, called the quiescent voltage hereafter. Inverting input (−) of amplifier 40 is connected to the output of amplifier 40 via a capacitor C1 of capacitance $C_1$. The inverting input (−) is also connected to ground GND via a capacitor C2 of capacitance $C_2$. A switch 42, controlled by signal $\Phi_1$, is placed across capacitor C1. A switch 44, controlled by binary signal $\Phi_2$, connects return track 18 to the output of amplifier 40. A switch 46, controlled by binary signal $\Phi_1$, connects return track 18 to quiescent voltage source VCM. As an example, quiescent voltage VCM is equal to half voltage VDD. In the following description, it will be considered that switches 36, 38, 41, 42, 44, 46 are on when the corresponding control signals are high and are off when the corresponding control signals are low. Controlled switches 36, 38, 41, 42, 44 may be formed of MOS transistors.

Gain Ga is obtained via amplifier 40. Indeed, in the case where switch 42 is off, the circuit formed of amplifier 40 and of capacitors C1 and C2 corresponds to an amplifier having its gain equal to ratio $(C_1+C_2)/C_1$. By providing, for example, for capacitor C2, a capacitor of variable capacitance, amplification gain Ga may be adapted to verify equation (5).

Figure 5:
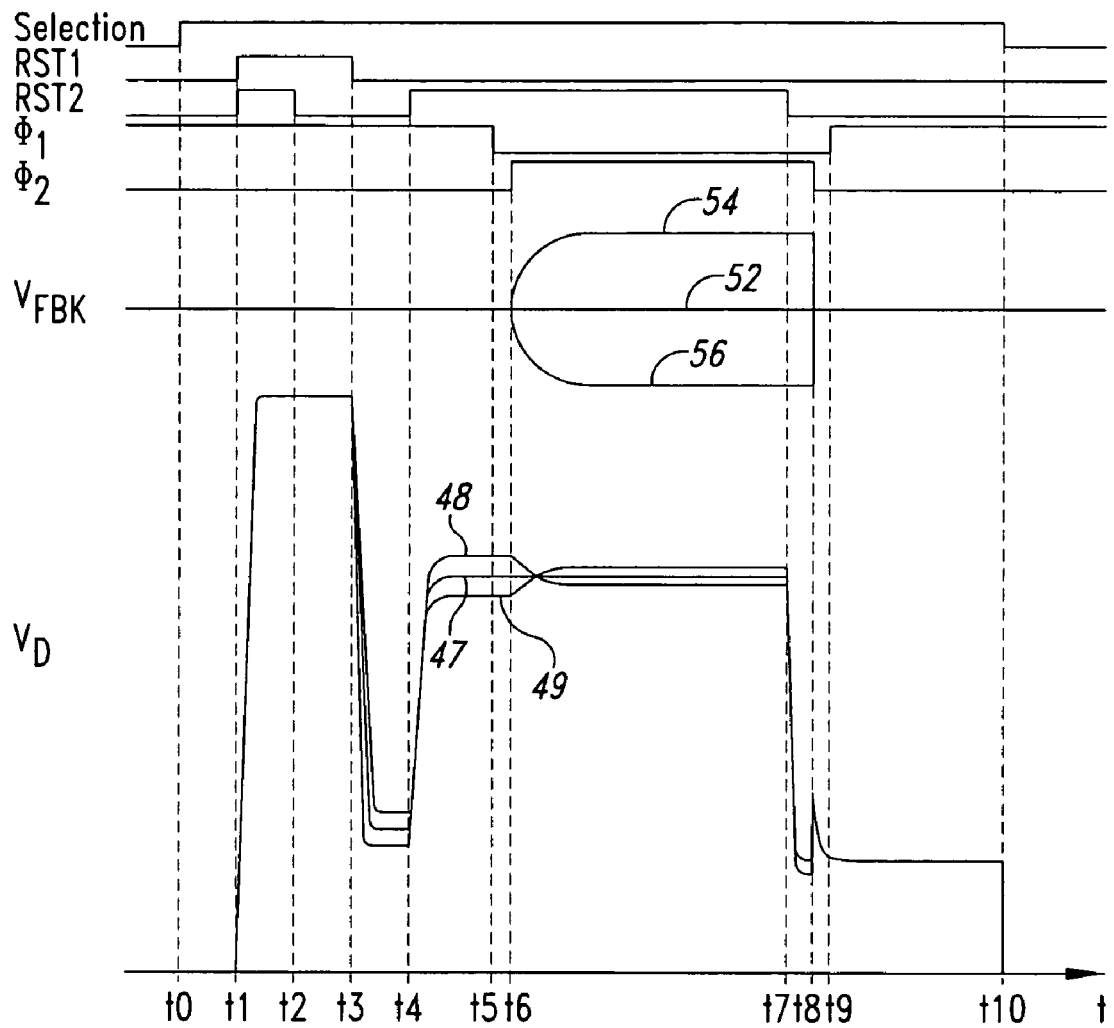
FIG. 5 shows an example of a timing diagram of signals representative of the operation of the device of FIG. 4.

FIG. 5 shows a timing diagram of signals representative of the operation of the device of FIG. 4, obtained by simulation. Successive times t0 to t8 delimit the steps of the correction method according to the present invention.

Initially, signal $\Phi_1$ is high and signal $\Phi_2$ is low. Switches 36, 41, 42 and 46 are thus on and switches 38, and 44 are off. Return track 18 is thus connected to quiescent voltage VCM and node E is connected to node D. Quiescent voltage VCM is applied to the non-inverting input (+) of amplifier 40 and is reproduced at the output of amplifier 40. Signal RST1 is low. Reset transistor 30 is thus off.

At time t0, signal Select switches from the low state to the high state. Select transistor 28 then turns on and the voltage at node D is representative of the voltage at node N. The voltage at node D can then be conventionally read by a read circuit.

At time t1, signals RST1 and RST2 switch from the low state to the high state. Reset transistor 30 and correction transistor 32 thus turn on. The voltage at node D, as well as the voltage at the junction point of capacitor $C_A$ and transistor 32 are set to a determined voltage.

At time t2, signal RST2 switches to the low state.

At time t3, signal RST1 switches to the low state. Transistor 30 switches from the on state to the off state. Transistor 30 induces a negative coupling so that voltage $V_D$, which follows the voltage at node N, decreases.

At time t4, signal RST2 switches to the high state and induces a positive coupling at node N so that voltage $V_D$ increases to a value $V_{DINI}$ equal to the sum of a constant determined term $V_0$, of the reset noise component, and of the fixed pattern noise component. The positive coupling induced when transistor 32 is turned on compensates for the negative coupling due to reset transistor 30. Such an operation is necessary since when transistor 32 is off, at a subsequent step, it induces a negative coupling. If the negative couplings due to transistors 30 and 32 were directly added, pixel 10 would risk saturating, that is, with too low a voltage at node N, even before the photodiode has started storing charges.

In FIG. 5, a portion of central curve 47 of the voltage at node D respectively corresponding to a zero reset noise and upper and lower curve portions 48 and 49 corresponding to a positive or negative reset noise have been shown. The voltage at node D is reproduced at node E. Voltage difference $VCM-V_{DINI}$ is thus applied across capacitor $C_{DC}$.

At time t5, when the voltage at node D is stabilized, signal $\Phi_1$ switches from the high state to the low state.

At time t6, signal $\Phi_2$ switches from the low state to the high state. Switch 36 is then off. Switch 38 is on and thus connects node E to voltage $V_{REF}$. Signal $\Phi_1$ being low, switch 41 is off. Via capacitor $C_{DC}$, a voltage variation equal to the difference between $V_{REF}$ and $V_{DINI}$ is then applied to the non-inverting input (+) of amplifier 40. Further, switch 42 being off, the output of amplifier 40 corresponds to the sum of quiescent voltage VCM and of correction voltage $\Delta V$ equal to the difference between $V_{DINI}$ and $V_{REF}$ multiplied by an amplification gain Ga equal to $-(C_1+C_2)/C_1$. Switch 44 connects node FBK to the output of amplifier 40. The voltage at node FBK thus varies from quiescent voltage VCM to the voltage equal to the sum of quiescent voltage VCM and of correction voltage $\Delta V$. In FIG. 5, a central curve portion 52 of the voltage at node FBK corresponding to a zero reset noise and upper and lower curve portions 54 and 56 corresponding to a negative and positive reset noise have been shown.

At time t7, signal RST2 switches from the high to the low state. Transistor 32 is then off.

At time t8, signal $\Phi_2$ switches from the high state to the low state. At time t9, signal $\Phi_1$ switches from the low state to the high state. Switch 44 is then off and switch 46 is on. Node FBK is thus connected to quiescent voltage VCM. The voltage at node D thus varies to stabilize at reference voltage $V_{REF}$, the reset noise and the fixed pattern noise being suppressed.

At time t10, signal Select switches from the high state to the low state. Select transistor 28 then turns off. The de-selection of pixel 10 being achieved as soon as the reset is over, this assumes that no measurement is performed at node D after the reset step. As described previously, such a measurement is generally used, with another measurement being performed after the charge step, for the fixed pattern noise correction. However, if desirable, select transistor 28 may be maintained on to enable sampling the voltage at node D.

Figure 6:
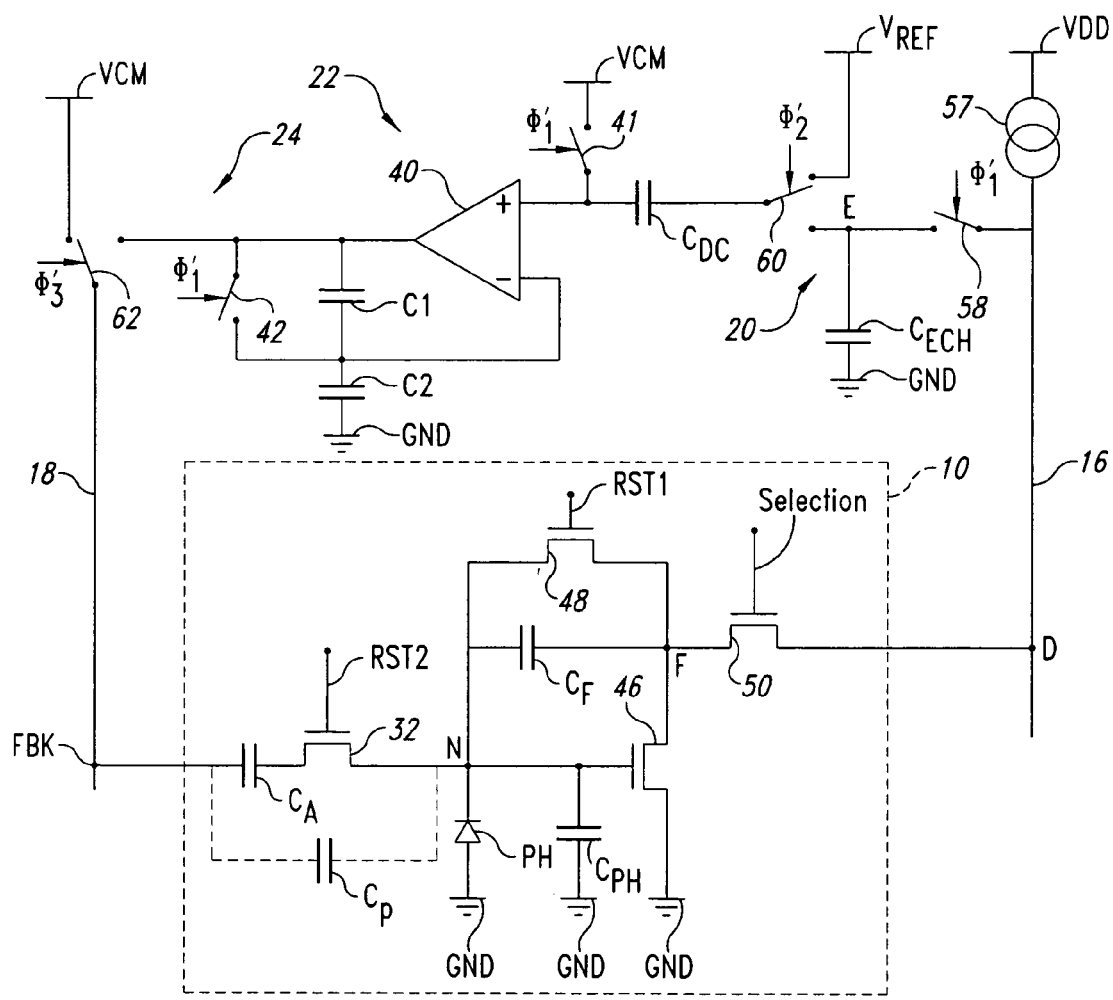
FIG. 6 shows a second more detailed example of the forming of the device of FIG. 1.

FIG. 6 shows a second detailed example of an embodiment of the correction device according to the present invention for a pixel 10 in which photosensitive module 14 corresponds to a pixel CTIA. Only the differences with the first example embodiment will be described in detail. Pixel 10 comprises a photodiode PH having its anode connected to ground GND, and having its cathode connected to a node N. Node N is connected to the gate of a read MOS transistor 46, assembled as an amplifier, having its source connected to ground GND. The drain of read transistor 46 is connected to a read node F. A capacitor $C_F$, of capacitance $C_f$, is placed between nodes N and F. A MOS reset transistor 48 is arranged across capacitor $C_F$. The source of reset transistor 48 is connected to node N and the drain of reset transistor 48 is connected to node F. The gate of reset transistor 48 is controlled by binary reset signal RST1. Node F is connected to read node D of read track 16 via a MOS select transistor 50. The gate of select transistor 50 is controlled by binary select signal Select. A terminal of a current source 57 is connected to read track 16, the other terminal of current source 57 being connected to voltage VDD.

The step of resetting such a pixel 10 is obtained by turning on reset transistor 48, which short-circuits nodes N and F. The voltage at node F is then set by the gate-source voltage of read transistor 46 imposed by the current supplied by current source 57.

For each column in the array, the correction device according to the present invention comprises a controlled switch 58 having a terminal connected to read track 16 and having its other terminal connected to a terminal of a sampling capacitor $C_{ECH}$ at node E. The other terminal of capacitor $C_{ECH}$ is connected to ground GND. Switch 58 is controlled by a binary control signal $\Phi'_1$. The correction device further comprises a switch 60 with two closed positions controlled by a binary signal $\Phi'_2$ capable of connecting a terminal of capacitor $C_{DC}$ to node E or to a constant reference voltage $V_{REF}$. The correction circuit further comprises a switch 62 with two on positions controlled by a binary signal $\Phi'_3$ and capable of connecting return track 18 to the output of amplifier 40 or return track 18 to quiescent voltage VCM.

As compared to the first embodiment, voltage $V_{DINI}$ is sampled and memorized via capacitor $C_{ECH}$. This is necessary since, given the amplifier assembly of read transistor 46, equivalent gain Gon–Goff is negative. The memorization of $V_{DINI}$ enables applying to the terminal of capacitor $C_{DC}$ unconnected to amplifier 40, first, reference voltage $V_{REF}$, then voltage $V_{DINI}$. A voltage variation equal to the difference between $V_{DINI}$ and $V_{REF}$ is then applied to the non-inverting input (+) of amplifier 40. The output of amplifier 40 then corresponds to the sum of quiescent voltage VCM and of correction voltage $\Delta V$ equal to the difference between $V_{DINI}$ and $V_{REF}$ multiplied by an amplification gain Ga equal to $(C_1+C_2)/C_1$, the gain further verifying equation (5).

Of course, the embodiments of the present invention are likely to have various alterations, modifications, and improvements which will readily occur to those skilled in the art. In particular, amplifier 40 may be off when return track 32 is connected to quiescent voltage VCM for power saving purposes and only be turned on little before the switching of signals $\Phi_1$, $\Phi_2$ before time $t_5$. Further, the output of amplifier 40 may permanently be connected to return track 18, switches 44, 46 of the first example of embodiment and switch 62 of the second embodiment being suppressed. This requires permanently supplying amplifier 40.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A device for correcting at least one of a reset noise and a fixed pattern noise of an active pixel having a photosensitive element connected to a read node, a voltage of the read node being representative of a charge of the photosensitive element, the charge of the photosensitive element being reset in a reset step, the device comprising:

a transmission circuit connecting the photosensitive element to a correction node and capable of operating in a first operating state in which a transmission gain between the correction node and the read node is equal to a first transmission gain and in a second operating state in which the transmission gain between the correction node and the read node is equal to a second transmission gain;

a circuit for measuring the voltage at the read node after reset of the charge of the photosensitive element, said voltage comprising at least one of a reset noise component and a fixed pattern noise component;

a circuit for providing a first correction voltage equal to a sum of a constant voltage and of a second correction voltage, comprising the at least one of the reset noise component and the fixed pattern noise component multiplied by an amplification gain having an absolute value equal to an absolute value of an inverse of a difference between the first transmission gain and the second transmission gain; and a correction circuit capable of bringing the correction node from the constant voltage to the first correction voltage, the transmission circuit being in the first operating state, and of bringing the correction node to the constant voltage, the transmission circuit being in the second operating state to subtract the at least one of the reset noise component and the fixed pattern noise component from the voltage at the read node.

2. The device of claim 1, wherein the pixel is contained in an array of identical pixels arranged in rows and in columns, the measurement circuit, the provision circuit, and the correction circuit being common for a set of pixels of a column of said pixel, the measurement circuit being connected to a read track connected to each read node of the set of pixels of the column of said pixel and the correction circuit being connected to a return track connected to each node of correction of the set of pixels of the column of said pixel.

3. The device of claim 1, wherein the transmission circuit comprises a transistor and a capacitor coupled in series between the correction node and the photosensitive element, the transistor being on in the first operating state of the transmission circuit and being off in the second operating state of the transmission circuit.

4. The device of claim 1, wherein the circuit for providing the correction voltage comprises an operational amplifier having an input connected to the measurement circuit via a connection capacitor.

5. The device of claim 4, wherein the amplifier further comprises an input connected to the output of the amplifier via a first capacitor and connected to a reference voltage by a second capacitor.

6. The device of claim 1, wherein an absolute value of the first transmission gain is greater than an absolute value of the second transmission gain.

7. The device of claim 2, wherein each pixel in the array has a read node and the correction circuit is capable of bringing the voltage at the read node of said pixel to a predetermined constant value equal to an average value of voltages at the read nodes of the pixels of the pixel array after a pixel reset step.

8. A method for correcting at least one of a reset noise and a fixed pattern noise of an active pixel comprising a photosensitive element connected to a read node, a voltage of the read node being representative of a charge of the photosensitive element, the charge of the photosensitive element being reset in a reset step, the photosensitive element being connected to a correction node via a transmission circuit capable of operating in a first operating state in which a transmission gain between the correction node and the read node is equal to a first transmission gain and in a second operating state in which the transmission gain between the correction node and the read node is equal to a second transmission gain, comprising the steps of:

measuring the voltage at the read node after reset of the charge of the photosensitive element, said voltage comprising at least one of a reset noise component and a fixed pattern noise component;

providing a correction voltage equal to a sum of a constant voltage and of a correction voltage, comprising the at least one of the reset noise component and the fixed pattern noise component multiplied by an amplification gain having an absolute value equal to an absolute value of an inverse of a difference between the first transmission gain and the second transmission gain;

bringing the correction node from the constant voltage to the correction voltage, the transmission circuit being in the first operating state;

switching the transmission circuit from the first operating state to the second operating state; and bringing the correction node to the constant voltage to subtract the at least one of the reset noise component and the fixed pattern noise component from the voltage at the read node.

9. The method of claim 8, wherein said active pixel having its voltage at the read node measured after reset of the charge of the photosensitive element of said active pixel is in a column of identical active pixels, each pixel having a read node, a correction node and a transmission circuit, the read nodes of all the pixels in the column being connected to one another and the correction nodes of all the pixels in the column being connected to one another, and wherein the transmission circuit of each active pixel in the column, other than the pixel having the voltage at its read node measured, is maintained in the second operating state when the correction node of the active pixel, having the voltage at its read node measured, is brought from the constant voltage to the correction voltage and brought back to the constant voltage.

10. The method of claim 9, wherein there is no reading of the voltage at the read node after the reset step.

* * * * *